US006936789B2

(12) United States Patent
Hanzel

(10) Patent No.: US 6,936,789 B2
(45) Date of Patent: Aug. 30, 2005

(54) TRIGGERLESS WELDING IMPLEMENT AND METHOD OF OPERATING SAME

(75) Inventor: Daniel J. Hanzel, Merrillville, IN (US)

(73) Assignee: Illinois Tool Works Inc., Glenview, IL (US)

( * ) Notice: Subject to any disclaimer, the term of this patent is extended or adjusted under 35 U.S.C. 154(b) by 118 days.

(21) Appl. No.: 10/284,647

(22) Filed: Oct. 31, 2002

(65) Prior Publication Data

US 2004/0084430 A1 May 6, 2004

(51) Int. Cl.[7] .................................................. B23K 9/10
(52) U.S. Cl. .................................. 219/132; 219/137.31
(58) Field of Search .............................. 219/132, 137.2, 219/137.31; 335/205

(56) References Cited

U.S. PATENT DOCUMENTS

| | | | | |
|---|---|---|---|---|
| 1,174,887 A | | 3/1916 | Meriwether | |
| 2,678,369 A | * | 5/1954 | Van Hook | 219/147 |
| 3,433,925 A | * | 3/1969 | Benfield | 219/137.42 |
| 3,571,544 A | | 3/1971 | Sheehan | 200/157 |
| 3,636,568 A | | 1/1972 | Stuner | 2/161 |
| 3,860,937 A | * | 1/1975 | Wolfe | 396/27 |
| 4,051,344 A | | 9/1977 | Robbins | 219/132 |
| 4,152,755 A | * | 5/1979 | Trosper et al. | 362/158 |
| 4,641,292 A | * | 2/1987 | Tunnell et al. | 219/132 |
| 5,093,933 A | | 3/1992 | Berry | 2/161 R |
| 5,736,711 A | * | 4/1998 | Joos et al. | 219/132 |
| 5,907,147 A | * | 5/1999 | La | 235/472.01 |
| 6,590,763 B2 | * | 7/2003 | Kishimoto | 361/683 |

FOREIGN PATENT DOCUMENTS

| | | |
|---|---|---|
| FR | 1140171 | 7/1957 |
| JP | 1322434 | 7/1973 |
| JP | 50-159444 | 12/1975 |

* cited by examiner

*Primary Examiner*—Clifford C. Shaw
(74) *Attorney, Agent, or Firm*—Fletcher Yoder

(57) ABSTRACT

A magnetically-actuated switch adapted to control a welding device. The magnetically-actuated switch may comprise a set of electrical connectors that are brought into electrical communication with one another by magnetic force. The magnetically-actuated switch may be disposed within a welding implement coupled to the welding device. The welding implement may be operated by disposing a magnet proximate to the welding implement to actuate the magnetically-actuated switch. The magnet may be disposed within a magnet holder securable to a hand.

39 Claims, 6 Drawing Sheets

TRIGGERLESS WELDING IMPLEMENT AND METHOD OF OPERATING SAME

FIELD OF THE INVENTION

The present technique system relates to welding systems, and more particularly to a triggerless welding assembly, system, and method.

BACKGROUND OF THE INVENTION

Welding is a method that may be used to either join pieces of metal or separate them apart. An exemplary type of welding process is arc welding. An arc welding system typically comprises an electrical power source coupled to a welding implement. An electrode is routed through the welding implement and is electrically coupled to the electrical power source. Additionally, a conductive cable is clamped to a work piece and routed back to the electrical power source. An electric arc is produced between the electrode and the work piece when the electrode is brought into close proximity to, or in contact with, the work piece. The electric current flows from the power source through the electrode to the work piece and back to the electrical power source through the conductive cable. The heat produced by the arc melts the work piece, or work pieces. The molten metal cools once the arc is removed, causing the molten material to solidify to form a weld.

One exemplary type of arc welding is Metal Inert Gas (MIG) welding. MIG welding is also known as "wire-feed" or Gas Metal Arc Welding (GMAW). In MIG welding, the wire serves as the electrode. The wire, supplied by a wire feeder, is routed through a welding cable connected to the power source at one end and a welding implement at the other end. Typically, the welding implement has a contact tip that is electrically coupled to the welding cable. As the wire passes through the contact tip, electric current flows through the welding cable and contact tip into the electrode wire. Typically, the heat generated by the arc melts the electrode wire, creating a filler material that combines with the molten metal. To prevent impurities and contaminants from entering the molten metal, a gas is used to form a shield around the molten metal.

Another form of wire-feed arc welding is known as Submerged-Arc Welding (SAW). In contrast to the inert gas employed in MIG welding, a SAW system uses a granular flux to protect the molten weld. As a user progresses the welding implement, a deposit of granular flux is placed ahead of the electrode and arc. The point of fusion is submerged within the layer of flux. The arc and molten weld are protected from impurities and contaminants by the surrounding flux. Moreover, the flux located adjacent to the arc melts and provides a slag layer that refines the weld and excludes air.

In wire-feed welding systems, a trigger in the welding implement controls the advance of the electrode wire. The trigger is typically biased by a spring to an outward, or inoperative, position. The spring bias must be overcome to operate the trigger and begin welding. After time, a user may become tired of holding the trigger against the spring bias. Consequently, a trigger lock may be employed to resist the outward bias of the trigger and maintain the trigger engaged. Typically, the trigger lock is a mechanical device that maintains the trigger in a depressed and engaged position. However, the installation of the trigger and trigger lock increases the time and cost of assembling and operating the welding implement. In addition, these devices are susceptible to failure from wear, requiring replacement.

There exists a need for an improved technique for assembling and operating a welding implement of a welding system. More specifically, there exists a need for a welding implement that may be operated without a trigger. In addition, there is a need for a wire-feed welding implement that may be operated continuously without a trigger-lock.

SUMMARY OF THE INVENTION

According to one aspect of the present technique, a novel welding system is featured. The welding system may comprise a welding implement, such as a welding gun. The welding implement may comprise a set of electrical contacts disposed within the welding gun and adapted to control the operation of the welding system. The electrical contacts may be adapted to be actuated by a magnet. The magnet may be secured to a hand, such as by a glove or strap.

According to yet another aspect of the present technique, a method for operating a welding system is featured. The method may comprise disposing a magnet proximate to a welding implement to actuate electrical connectors disposed within the welding implement, thereby controlling operation of the welding system.

According to another aspect of the present technique, a novel method of assembling a welding implement is featured. The method may comprise disposing a magnetically-actuated electrical connector within the welding implement. The method may also comprise coupling control wiring to the magnetically-actuated electrical connector.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
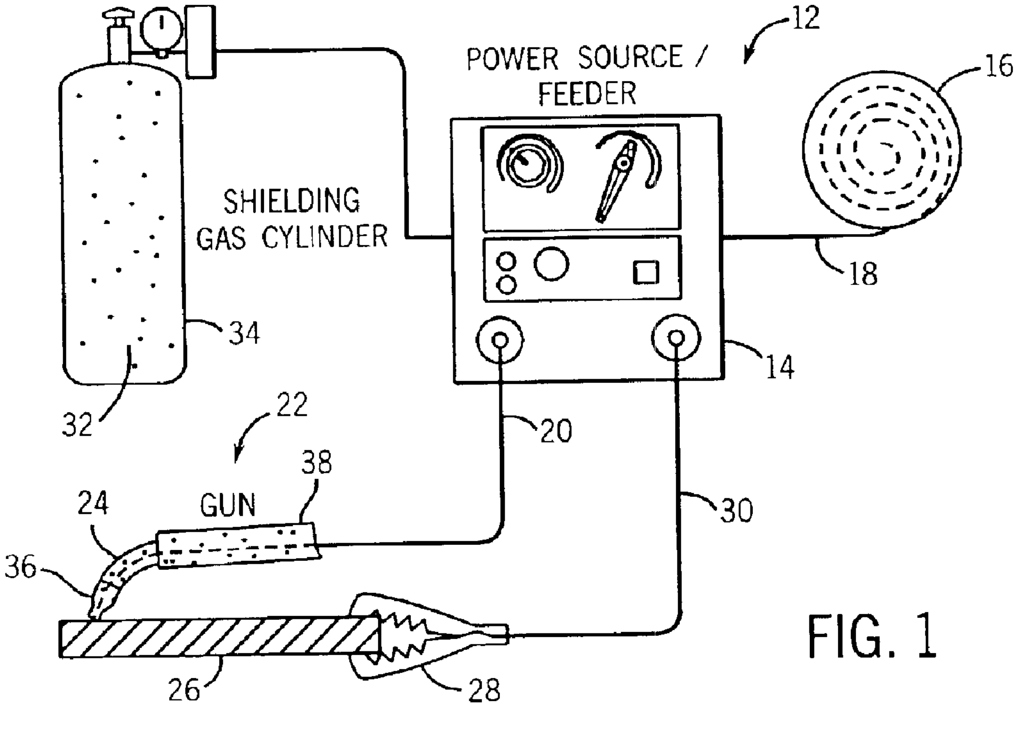
FIG. 1 is a diagram of a triggerless MIG welding system, according to an exemplary embodiment of the present technique.

Referring generally to FIG. 1, this figure depicts an exemplary portable MIG arc welding system 12. However, the present techniques are applicable to other types of arc welding systems, such as fixed systems and submerged arc welding systems. The illustrated embodiment includes a power source/wire feeder 14 having a wire spool 16. The power source/wire feeder 14 accepts an electrode wire 18 from the wire spool 16 and directs the electrode wire 18 into a welding cable 20 of a welding gun 22. However, the present techniques are applicable to welding implements other than a welding gun, such as a robotic welder. In addition, the welding cable 20 is adapted with conductors (not shown) to conduct electric power from the power source/wire feeder 14. In this embodiment, the wire 18 is guided from the welding cable 20 to a neck 24 of the welding gun 22.

A work piece 26 is electrically coupled to one terminal of the power source/wire feeder 14 by a ground clamp 28 and a ground cable 30. An electrical circuit between the work piece 26 and power source/wire feeder 14 is completed when the electrode wire 18 is placed in proximity to, or in contact with, the work piece 26, producing an arc between the wire 18 and the work piece 26. The heat produced by the electric current flowing into the work piece 26 through the arc causes the work piece 26 to melt in the vicinity of the arc, also melting the electrode wire 18. In the illustrated embodiment, gas 32 stored in a gas cylinder 34 is used to shield the molten weld puddle from impurities. However, other methods of providing a shield gas also may be utilized.

In the illustrated embodiment, the gas cylinder 34 feeds gas 32 to the power source/wire feeder 14. The gas 32 is fed, along with the electrode wire 18, through the welding cable 20 to the neck 24 of the welding gun 22. The neck 24 has a nozzle assembly 36 that is adapted to direct the gas 32 towards the work piece 26. The shield gas 32 prevents impurities from entering the molten weld puddle and thereby affecting the integrity of the weld.

Figure 2:
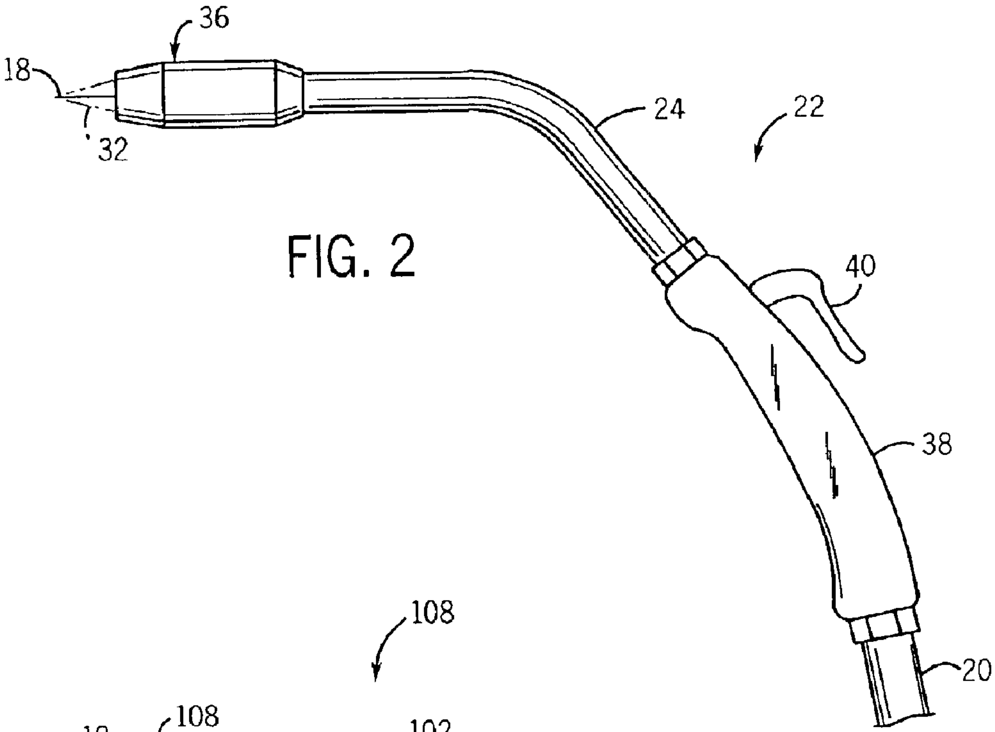
FIG. 2 is a front elevation view of a triggerless MIG welding gun, according to an exemplary embodiment of the present technique.

Referring generally to FIG. 2, a more detailed illustration of the welding gun 22 is provided. The welding gun 22 also has a handle 38 that may be used to hold the welding gun 22. In the illustrated embodiment, a mounting hook 40 is provided to enable the welding gun 22 to be hung from a fixture. As discussed above, the welding gun 22 is employed to receive electrode wire 18 and gas 32 into the welding cable 20 and direct them through the neck 24 toward the work piece 26. The neck 24 guides the gas 32 and electrode wire 18 to the nozzle assembly 36. The nozzle assembly 36, in turn, directs the gas 32 and wire 18 towards the work piece 26. The nozzle assembly 36 is adapted to concentrate the shield gas 32 at the point of arcing on the work piece 26.

Figure 3:
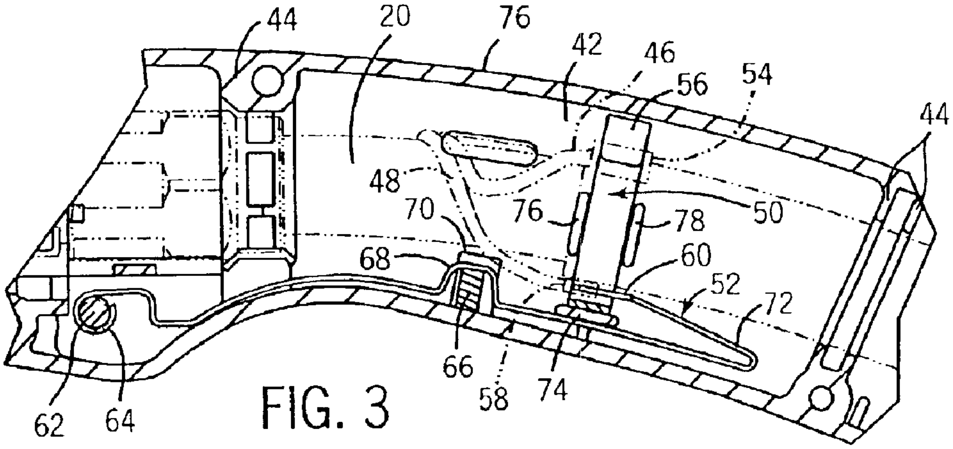
FIG. 3 is a cross section view of a triggerless welding gun handle, according to an exemplary embodiment of the present technique.

Referring generally to FIG. 3, the handle 38 of the welding gun 22 has an inner cavity 42 through which the welding cable 20 is disposed. In the exemplary embodiment, the welding cable 20 is secured within the cavity 42 by a series of supporting ribs 44 extending from, interior surfaces of the handle 38. The welding cable has a first conductor 46 and a second conductor 48 that are used to control operation of the power source/wire feeder 14. In the illustrated embodiment, the welding gun 22 has a first electrical contact 50 and a second electrical contact 52 that form a magnetically-actuated switch for the first and second conductors 46, 48. The first conductor 46 is coupled to the first electrical contact 50 and the second conductor 48 is coupled to the second electrical contact 52. In this embodiment, the first electrical contact 50 is stationary and the second electrical contact 52 is movable under the influence of a magnetic field. When the first electrical contact 50 and second electrical contact 52 are brought together by a magnetic field, the first conductor 46 is electrically coupled through the first electrical contact 50 and second electrical contact 52 to the second conductor 48. The conductors 46, 48 may be coupled to a welding device, such as the power source/wire feeder 14, a separate power source, a separate wire feeder, a gas distributor, or any other welding device that the user may wish to remotely activate.

In this embodiment, the first electrical contact 50 comprises a curved metal loop that generally conforms to the interior of the handle 38. The first conductor 46 is adapted with a terminal connector 54. A portion of at least one end of the first electrical contact 50 is bent to form a corresponding terminal 56 for receiving the terminal connector 54. In this embodiment, the second electrical conductor 48 also is comprised of metal and has a terminal connector 58. In the illustrated embodiment, the end of the second electrical contact 52 also is adapted to form a terminal 60 for receiving the terminal connector 58 of the second conductor 48. The terminal connectors 54, 58 are adapted to slide onto the first and second terminals 58, 60. However, other methods of electrically coupling the conductors 46, 48 to the first and second electrical contacts 50, 52 may be utilized.

In the illustrated embodiment, the second electrical contact 52 is pivotably secured to the handle 38. The handle 38 has a circular pivoting pin 62 and a portion 64 of the second electrical contact 52 is looped around the pin 62 to enable the first electrical contact 52 to pivot about the pin 62. However, the second electrical contact 52 may also be flexed, rather than pivoted. A compression spring 66 is provided to bias the second electrical contact 52 upward into a disengaged position, relative to the first electrical contact 50. A portion 68 of the second electrical contact 52 is adapted to receive the spring 68. A stop 70 is provided to define a limit of travel of the second electrical contact 52. The stop 70 may also prevent contact between the second electrical contact 52 and the welding cable 20. In the illustrated embodiment, a portion 72 of the second electrical contact 52 is directed back towards the first electrical contact 50 to position the terminal 60 proximate to the first electrical contact 50. In the illustrated embodiment, the first electrical contact 50 is disposed on a platform 74 extending from an inner surface of the handle 38. The platform 74, in conjunction with the inner surface of the handle 38, vertically secures the first electrical contact 52 within the handle 38. The first electrical contact 68 is horizontally secured between a first tab 76 and a second tab 78 that extend from the inner surface of the handle 38.

Figure 4:
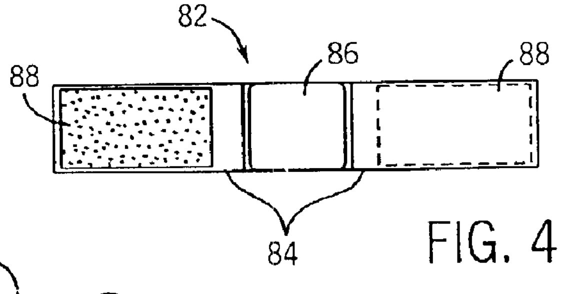
FIG. 4 is a plan view of an exemplary finger-strap magnet, according to an exemplary embodiment of the present technique.
Figure 5:
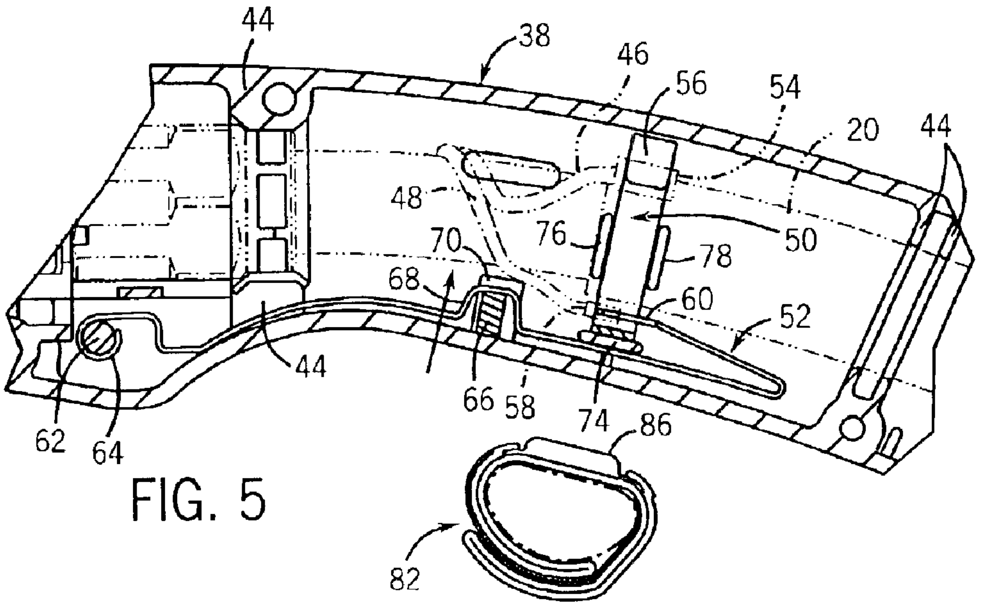
FIG. 5 is a cross-sectional view of the triggerless welding gun of FIG. 3 and the finger-strap magnet of FIG. 4.
Figure 6:
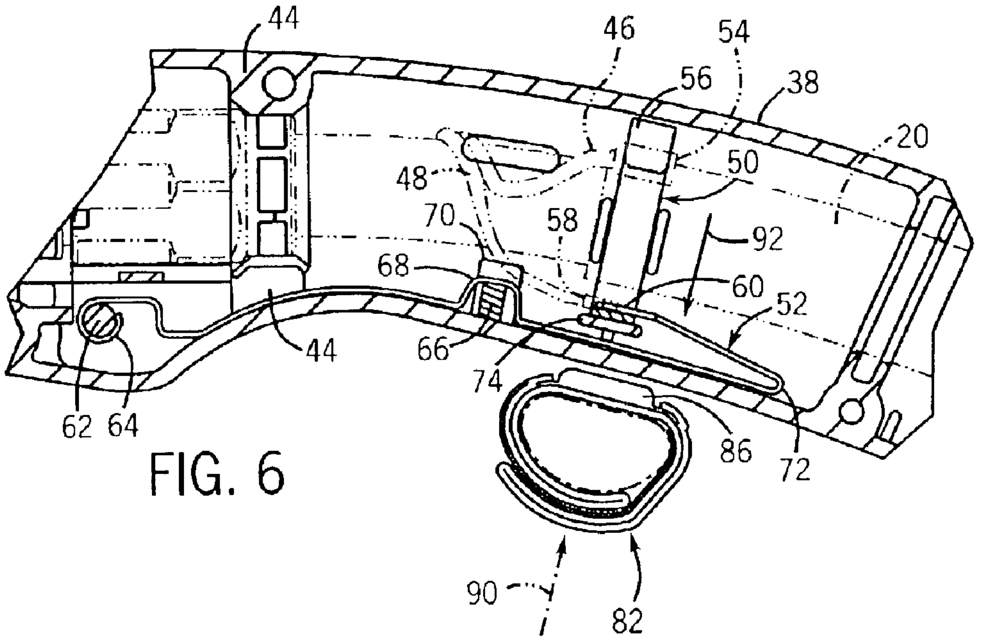
FIG. 6 is a cross-sectional view of the triggerless welding gun of FIG. 3 and the finger-strap magnet of FIG. 4, illustrating the magnet being brought into proximity with the welding gun to operate the welding gun.

Referring generally to FIGS. 4–6, activation of a welding device occurs when the second electrical contact 52 is electrically coupled to the first electrical contact 50. To effectuate this coupling, the illustrated embodiment employs a magnetic source to urge the second electrical contact 52 toward the first electrical contact 50. FIG. 4 illustrates a finger-strap 82 that provides a magnetic force to operate the welding gun 22. In the illustrated embodiment, the finger-strap 82 comprises flexible straps 84 affixed to opposite ends of a permanent magnet 86. However, an electromagnet may also be used. In the exemplary embodiment, complimentary hook-and-loop regions 88, such as VELCRO™, are placed on the straps. The user may secure the finger-strap 82 to his or her hand by wrapping the straps 84 around his or her finger and securing the straps with the hook-and-loop regions 88. In addition, the strap 82 may be adapted to enable the magnet 86 to be removed.

Referring generally to FIG. 5, at a certain distance, the attraction between the magnet 86 and the lever arm connector 52 is not strong enough to overcome the bias of the spring 66. However, as illustrated in FIG. 6, when a user grips the handle 38 and places the finger-strap 82 proximate to the handle 38, as represented by the arrow 90, the magnetic field produced by the embedded magnet 86 overcomes the bias of the spring 66 and attracts the second electrical contact 52 towards the magnet 86, as represented by the arrow 92, causing the second electrical contact 52 to be electrically coupled to the first electrical contact 50. In this embodiment, the terminal connector 58 disposed on the terminal 60 of the second electrical contact 52 is brought into contact with the first electrical contact 50 to complete the circuit. However, the second electrical contact 52 may be adapted to contact the first electrical contact 50 directly. Once the first and second conductors 46, 48 are electrically coupled, a circuit between the contacts and the power source/wire feeder 14 is closed. In this embodiment, closing the circuit causes the power source/wire feeder 14 to feed electrode wire 18 to the welding gun 22. However, closing the circuit may cause the power source/wire feeder 14 to apply power to the welding gun 22, or perform other welding system functions. In addition, a user need not overcome a spring bias to activate the welding gun. In this embodiment, simply positioning the magnet 86 against the welding gun 22 will activate the welding system 12. Maintaining the magnet 86 against or proximate to the welding gun also acts as a trigger lock, maintaining operation of the system. The magnet 86 may be removed from the strap 84 and placed against the welding gun. The magnet 86 may be adapted such that the magnetic force between the magnet 86 and the second contact 52 maintains the magnet 86 disposed against the welding gun, thereby maintaining operation of the system. In addition, the system may be adapted to operate in response to an open circuit, rather than a closed circuit.

In the illustrated embodiment, if a user desires to stop welding, the user need only move his or her finger away from the handle 38. At a certain distance, the bias of the spring 66 overcomes the force of attraction of the magnet 86 on the second contact 52, urging the second contact 52 away from the first contact 50. Thus, the first conductor 46 is no longer electrically coupled to the second conductor 48, opening the circuit with the power source/wire feeder 14. In this embodiment, when the circuit is opened, the power source/wire feeder 14 ceases feeding electrode wire 18 to the welding gun 22. However, the open circuit may cause other power source/wire feeder 14 operations to end, or begin.

Figure 7:
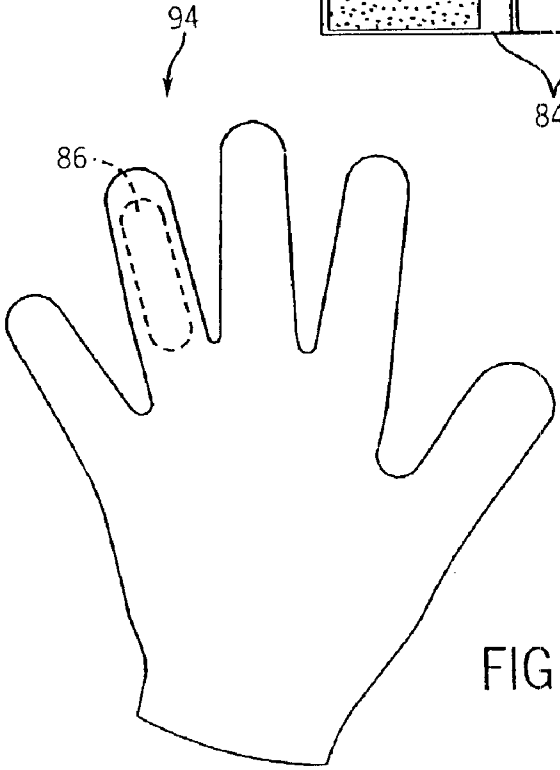
FIG. 7 is a plan view of a magnetic glove, according to an alternative embodiment of the present technique.

FIG. 7 illustrates an alternative to the finger-strap 82. In the illustrated embodiment, a magnetic glove 94 is provided. The glove 94 comprises a magnet 86 embedded within the fabric of the glove. However, the magnet 86 may be adapted to be removed from the glove 94. In this embodiment, the magnet 86 is disposed on the palm side of the ring finger. However, the magnet may be disposed in other areas of the glove 94. To operate the welding system, a user grips the handle 38 and places their ring finger against, or proximate to, the handle 38. This brings the embedded magnet 86 close enough to the second electrical connector 52 to enable the magnet 86 to overcome the bias of the spring 66. In the illustrated embodiment, the glove is a welder's glove. The fabric of the glove is adapted to thermally insulate a hand from heat generated during welding. However, the magnet 86 may be placed in other types of gloves as well.

Figure 9:
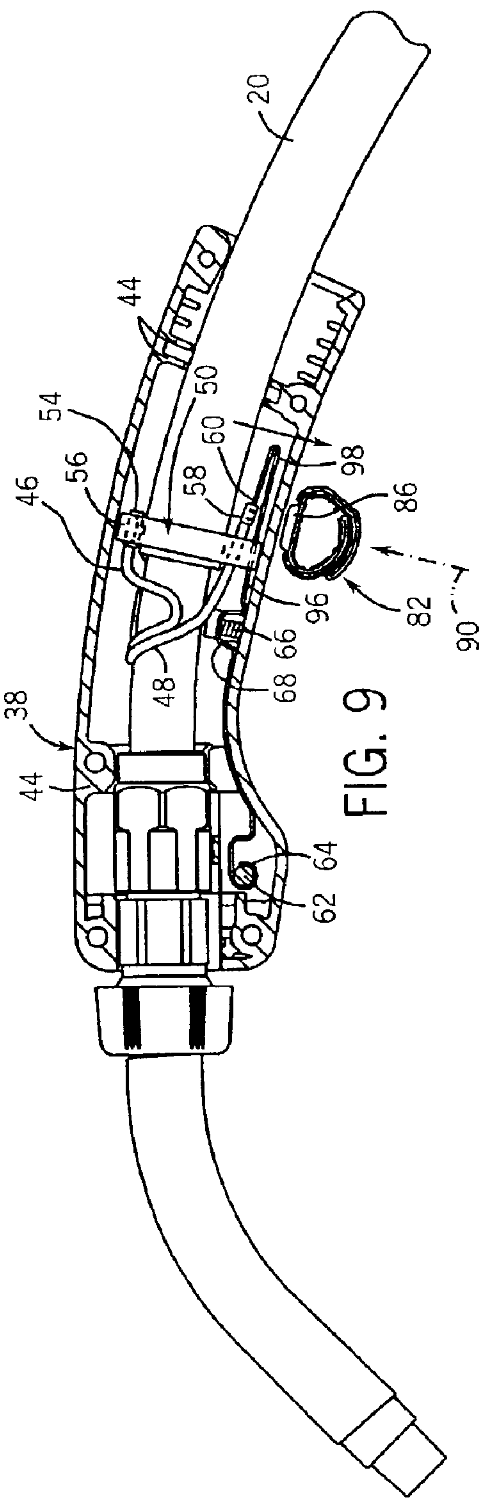
FIG. 9 is a cross-sectional view of the triggerless welding gun of FIG. 8 and the finger-strap magnet of FIG. 4, illustrating the magnet being brought into proximity with the welding gun to operate the welding gun.
Figure 8:
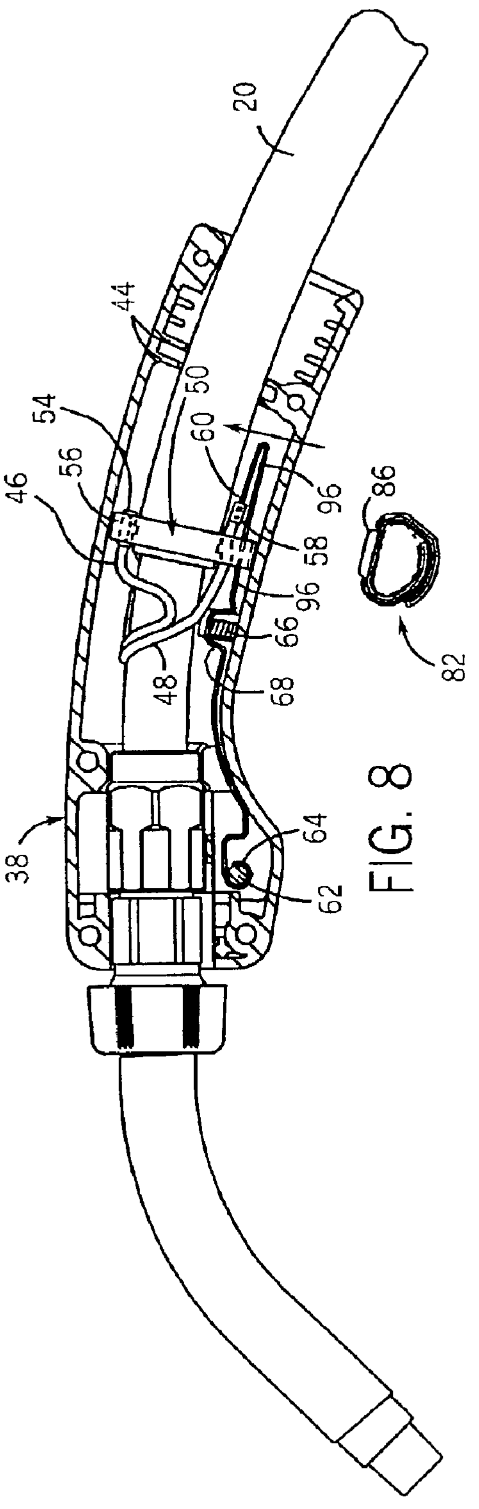
FIG. 8 is a cross-sectional view of an exemplary triggerless welding gun, according to an alternative exemplary embodiment of the present technique.

Referring generally to FIGS. 8 and 9, an alternative embodiment of a welding gun is illustrated. In this embodiment, a second electrical contact 96 is adapted to contact the first electrical contact 50 directly. When the magnet 86 is brought into close proximity with the handle 38, the main body 98 of the second electrical contact 52, and not the terminal connector 58 of the second conductor 48, makes contact with the first electrical contact 50.

Figure 10:
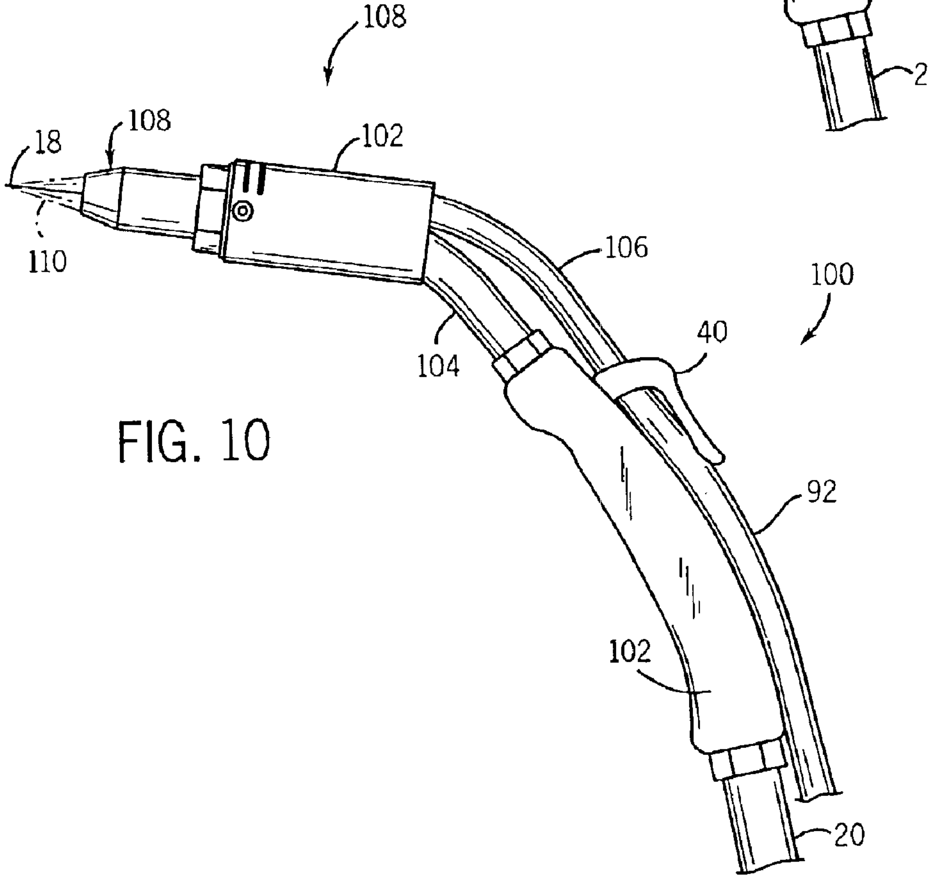
FIG. 10 is a front elevation view of a triggerless SAW welding gun according to an exemplary embodiment of the present technique.

Referring generally to FIG. 10, a triggerless welding gun 100 for a SAW system is illustrated. In the illustrated embodiment, the SAW welding gun 100 has a handle 102 coupled to a welding cable 20. Disposed within the SAW welding gun 100 is a magnetically-actuated switch, in accordance with the present technique. The SAW welding gun 100 has a neck 104 and a hose 106 coupled to a flux distribution assembly 108. The neck 104 is adapted to couple electrode wire 18 and power to the flux distribution assembly 108. The hose 106 is adapted to couple flux 110 to the flux distribution assembly 108. The flux distribution assembly 108 merges the flow of electrode wire 18 and flux 106.

In this embodiment, when a magnet (not shown) is brought into proximity to the handle 102 of the triggerless SAW welding gun 100, the magnetically-actuated switch inside the welding gun 100 is activated. A signal is provided through the welding cable 20 to a welding device. Wire 18 and flux 110 are fed to the welding cable 20 and begin to flow out of the flux distribution assembly 108 towards a work piece. The resultant arc is thereby submerged in flux 110. The flux 110 disposed proximate to the weld puddle is heated to a molten state and is incorporated into the weld. The unused flux may be recycled. When the magnet is moved away from the handle 102, the magnetically-actuated switch is de-activated and wire 18 and flux 110 are no longer fed to the welding gun 100.

Figure 11:
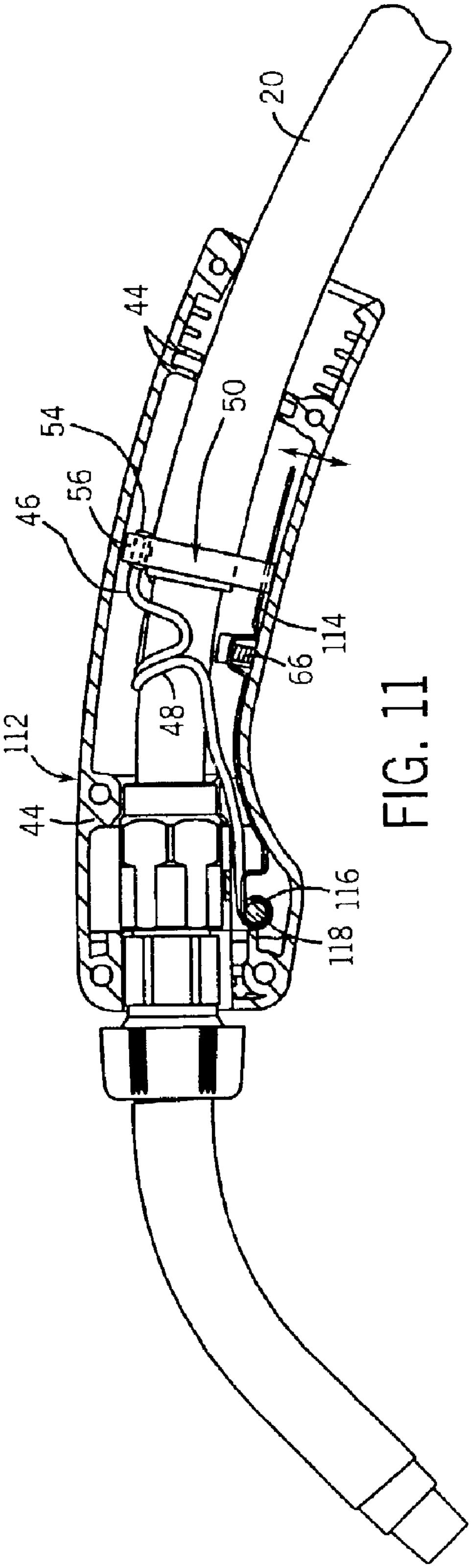
FIG. 11 is a cross-sectional view of a second alternative exemplary triggerless welding gun, according to an alternative exemplary embodiment of the present technique.

Referring generally to FIG. 11, a second alternative embodiment of a welding gun 112 is illustrated. In this embodiment, the welding gun 112 has an alternative second contact 114. The second conductor 48 is adapted with a ring connector 116 adapted to be disposed over a conductive post 118. The second contact 114 also is disposed over a post 118, enabling the second contact to pivot about the post 118. When assembled, the second contact 114 is abutted against the ring terminal 116, electrically coupling the second conductor 48 and second contact 114. The second contact 114 is adapted to pivot about the post 118 in response to a magnetic field, as in the embodiments described above. When a magnet is disposed proximate to the second contact 114, the second contact 114 is pivoted downward (in this view) into contact with the first contact 50. As the magnet is brought away from the second contact, the spring 66 urges the second contact 114 upward (in this view), disengaging the second contact 114 from the first contact 50. However, in this embodiment, the second conductor 48 does not move with movement of the second contact 114.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A welding implement comprising:

a cable adapted to electrically couple the welding implement to a welding device, the cable having a first conductor and a second conductor; and a magnetically-actuated electrical switch electrically coupled to the first and second conductors, wherein the magnetically-actuated electrical switch is operable to electrically couple the first conductor to the second conductor in response to a magnetic field generated by a magnetic field source securable to an operator.

2. The welding implement as recited in claim 1, wherein the magnetically-actuated electrical switch electrically couples the first conductor to the second conductor when the magnetically-actuated electrical switch is actuated.

3. The welding implement as recited in claim 1, wherein the magnetically-actuated switch is disposed within a welding handle.

4. The welding implement as recited in claim 3, comprising a magnet adapted to actuate the magnetically-actuated electrical switch when disposed at an external location proximate to the magnetically-actuated switch within the welding handle.

5. The welding implement as recited in claim 4, wherein the magnet is secured to a magnet holder securable to a portion of a hand.

6. The welding implement of claim 1, wherein the magnetically-actuated electrical switch comprises a pivotable contact, the first conductor being electrically coupled to the pivotable member.

7. The welding implement as recited in claim 6, wherein the magnetically-actuated electrical switch comprises a spring adapted to bias the pivotable member to a desired position.

8. The welding implement as recited in claim 6, wherein the magnetically-actuated electrical switch comprises a stationary contact electrically coupled to the second conductor.

9. A welding implement, comprising:

a first magnetically actuatable electrical connector disposed within the welding implement, a second electrical connector disposed within the welding implement;

an external magnet removably securable to a portion of a user and adapted to induce the first electrical connector into electrical communication with the second electrical connector.

10. The welding implement as recited in claim 9, wherein the magnet is secured to the user by a flexible band.

11. The welding implement of claim 9, comprising a cable coupleable to a welding device, the cable comprising a first and a second conductor operable to control operation of the welding device.

12. The welding implement as recited in claim 11, wherein the first electrical connector is adapted to receive the first conductor and contact the second electrical connector.

13. The welding implement as recited in claim 12, comprising a spring disposed within the welding implement to bias the first electrical connector into a disengaged position with respect to the second electrical connector.

14. The welding implement as recited in claim 11, wherein the second electrical connector comprises a curved metal band adapted to receive the second conductor and contact the first electrical connector.

15. A welding system, comprising:

a welding device;

a magnetically-actuated switch adapted to control the operation of the welding device; and a magnetic operator to enable a welding system user to actuate the magnetically-actuated switch, wherein the magnetic operator is securable to a portion of a user to enable the user to actuate the magnetically-actuated switch by positioning a portion of the user proximate to the magnetically-actuated switch.

16. The welding system as recited in claim 15, comprising a biasing member biased to de-actuate the magnetically-actuated switch.

17. The welding system as recited in claim 15, wherein the magnetically-actuated switch is disposed within a welding implement.

18. The welding system as recited in claim 17, comprising a cable adapted to couple the magnetically-actuated switch to the welding device, the cable being adapted to convey electrode wire therethrough.

19. The welding system as recited in claim 18, wherein the welding device comprises a wire feeder.

20. The welding system as recited in claim 18, wherein the welding device comprises a power source.

21. The welding system as recited in claim 15, wherein the magnetically-actuated switch comprises a conductive member adapted to move into engagement with a stationary contact when the magnetic operator is disposed proximate to the conductive member.

22. A kit for a welding implement, comprising:

a magnetically-actuated switch adapted to be disposed within a handle of the welding implement, the magnetically-actuated switch being coupleable to conductors electrically coupleable to a welding device, wherein the magnetically-actuated switch is operable in response to a magnetic field generated by a magnetic field source securable to a user.

23. The kit as recited in claim 22, comprising an external magnet adapted to actuate the magnetically-actuated switch to control operation of the welding device when disposed proximate to the welding implement.

24. A glove, comprising:

a thermally insulating material configured to thermally insulate an operator's hand from heat generated during operation of a welding device; and a magnet secured to the thermally insulating material.

25. The glove as recited in claim 24, wherein the magnet is disposed proximate to a finger of the glove.

26. A method of operating a welding system comprising:

securing a magnet to a portion of a hand; and selectively positioning the portion of a hand relative to a magnetically-actuated switch to control an operation of the welding system.

27. The method as recited in claim 26, wherein selectively positioning comprises positioning the portion of a hand proximate to the magnetically-actuated switch to initiate an operation of the welding system.

28. The method as recited in claim 26, wherein selectively positioning comprises displacing the portion of a hand from the magnetically-actuated switch to secure the operation of the welding system.

29. The method as recited in claim 26, wherein the operation of the welding system comprises feeding electrode wire from a wire feeder.

30. The method as recited in claim 29, wherein the operation of the welding system comprises applying power from a power source to the electrode wire.

31. A method of assembling a welding implement, comprising:

securing a magnetically-actuated switch that is responsive to a magnetic field generated by a magnetic field source securable to a user, wherein the magnetically-actuated switch is configured to activate a welding device; and coupling the magnetically-actuated switch to conductors electrically coupled to the welding device.

32. The method as recited in claim 31, wherein the magnetically-actuated switch is disposed within a welding gun.

33. A welding implement, comprising:

a housing;

an internal switch disposed within the housing and adapted to control operation of a welding device; and a switch operator disposed externally to the housing and adapted to operate the internal switch without contacting the internal switch, wherein the switch operator produces a magnetic field and the internal switch is operable in response to the magnetic field.

34. The welding implement as recited in claim 33, wherein the switch operator is separate from the housing.

35. A welding implement, comprising:

a housing;

an internal switch adapted to control operation of a welding device, the internal switch being contained within the housing; and a switch operator adapted to operate the internal switch, the switch operator being securable to an operator.

36. The welding implement as recited in claim 35, wherein the switch operator produces a magnetic field and the internal switch is operable in response to the position of the magnetic field relative to the housing.

37. A welding implement comprising:

a cable adapted to electrically couple the welding implement to a welding device, the cable having a first conductor and a second conductor; and a magnetically-actuated electrical switch electrically coupled to the first and second conductors, wherein the magnetically-actuated switch is triggerlessly operable to electrically couple the first conductor to the second conductor in response to a magnetic field source securable to a user.

38. The welding implement as recited in claim 37, wherein the magnetically-actuated switch is disposed in a welding handle.

39. The welding implement as recited in claim 37, comprising a magnet secured to a magnet holder securable to a hand.

* * * * *